Nov. 3, 1964   P. R. MOBLEY   3,155,499
BRAZING ALLOY
Filed April 2, 1962
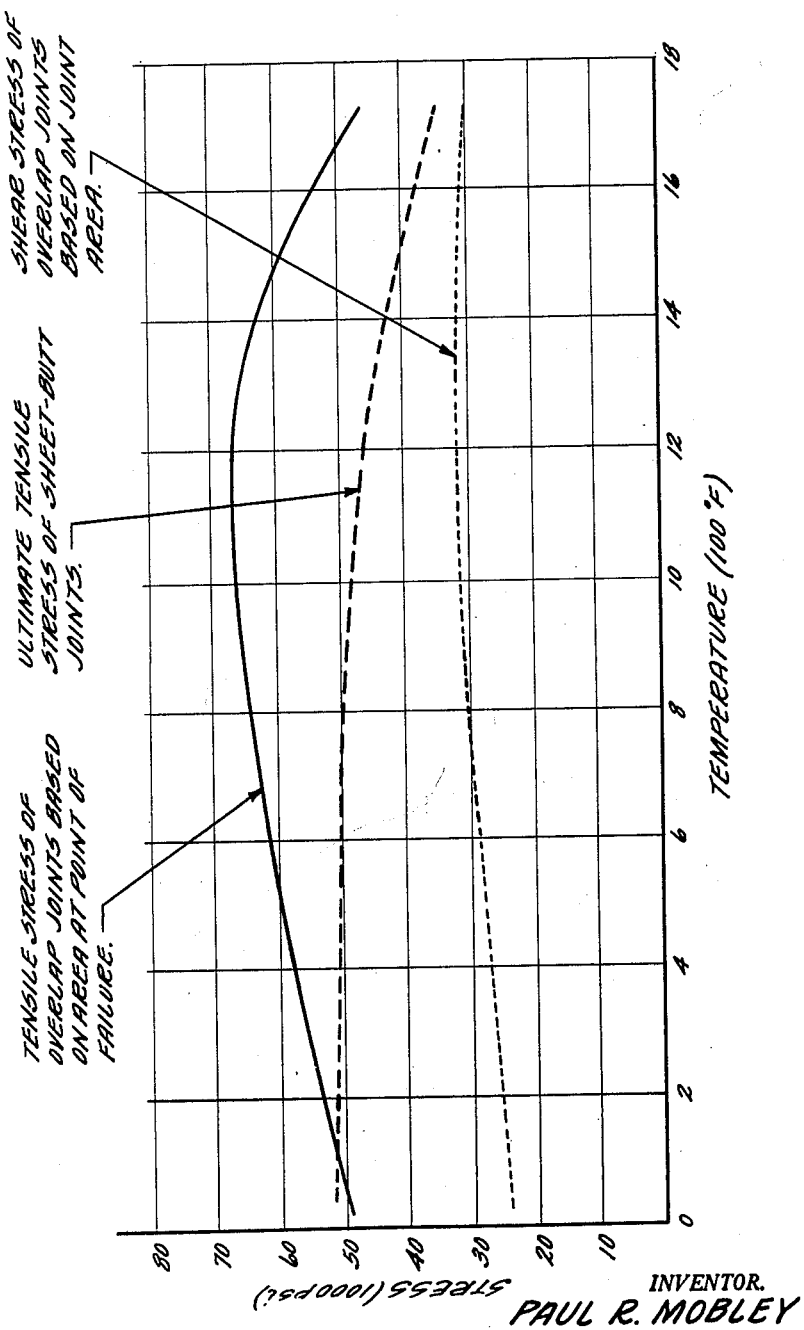
INVENTOR.
PAUL R. MOBLEY
BY
ATTORNEY-

United States Patent Office 3,155,499
Patented Nov. 3, 1964

3,155,499
BRAZING ALLOY
Paul R. Mobley, Cincinnati, Ohio, assignor to General Electric Company, a corporation of New York
Filed Apr. 2, 1962, Ser. No. 184,443
2 Claims. (Cl. 75—134)

This invention relates to brazing alloys and, more particularly to a Ni—Cr—Pd—Si base brazing alloy strengthened by the addition of the elements Ti and Al.

The design of advanced structures for operation at elevated temperatures such as up to about 2000 F. has stressed the need for fabrication processes involving the brazing of formed sheet metal assemblies and materials difficult to weld. Structures which are intended for propulsion systems also require light weight components and difficult to weld materials with consequent high working stresses. Applications of this type have resulted in a need for high temperature brazing alloys which have improved strength at high temperature and which must be compatible with the metallurgical characteristics of the base metal alloy being joined.

A principal object of the present invention is to provide an improved high temperature brazing alloy having greatly improved oxidation resistance and strength at elevated temperatures.

Another object is to provide a strong, oxidation resistant high temperature brazing alloy having precipitation strengthening characteristics affected by heat treatment concurrently with the normal processing of available age hardenable structural materials.

These and other objects and advantages will be more readily understood from the following detailed description and examples as well as from the accompanying drawing all of which is meant to be typical of but not a limitation on the scope of the present invention.

The drawing is a graphical presentation of the tensile properties of a high temperature nickel base structural alloy brazed with a form of the alloy of the present invention.

Briefly, the alloy of the present invention, in one form, provides a precipitation strengthened brazing alloy consisting essentially of, by weight, 30–35% Cr, 16–19% Pd, 4–6% Si, 1.1–3% Ti, 1–2.5% Al, with the balance nickel and impurities.

Although the Ni—Cr—Pd and the Ni—Cr—Pd—Si type brazing alloys have been recognized as etxremely useful for certain applications, the design of high temperature operating heat exchangers and similar components manufactured from difficult-to-braze nickel base super alloys showed the need for a strong, oxidation resistant high temperature brazing alloy which could be precipitation strengthened along with the nickel base super alloy and which would be compatible with such alloy. One nickel base alloy which has been found to be useful in the manufacture of such a heat exchanger is sometimes referred to as Raney 41 nickel base alloy and which has the preferred composition range, by weight, of 0.06–0.12% C, 18–20% Cr, 0.003–0.010% B, 10–12% Co, 9–10.5% Mo, 3.0–3.3% Ti, 1.4–1.6% Al with the balance nickel and a maximum of about 0.5 each for Si, Mn and Fe.

It was unexpectedly recognized that the addition of aluminum and titanium in a particular range to a Ni—Cr—Pd—Si base brazing alloy resulted in an unusually strong, oxidation resistant brazing alloy which was compatible with Raney 41 nickel base structural alloy. The following table is representative of those alloys tested in connection with the study of the alloy of the present invention.

| Example | Weight Percent (Balance Ni and Imp.) | | | | | | Erosive to Raney 41 | Tensile Shear Data | |
|---|---|---|---|---|---|---|---|---|---|
| | Cr | Pd | Si | Ti | Al | Y | | Temp. (° F.) | Strength, k.p.s.i. |
| Pd 43 | 31 | 23 | 4 | 1 | | | No | 1,750 | 0.9 |
| Pd 46 | 30 | 22 | 4 | | 1 | | No | 1,750 | 11.2 |
| Pd 44 | 34.3 | 20.8 | 3.8 | 1.0 | 2.3 | | Yes | 1,750 | 12.1 |
| Pd 48 | 33 | 22 | 4.6 | 1.1 | 1.1 | 0.5 | Yes | 1,700 | 14.3 |
| Pd 51 | 31.1 | 17.4 | 4.8 | 2.8 | 1.8 | | No | 1,700 | 48.0 |
| Pd 52 | 31.4 | 21.0 | 4.7 | 2.3 | 0.9 | | No | 1,700 | 14.7 |

All of the brazing alloys shown in the above table have a brazing temperature of about 2150° F. Comparing Examples Pd 43 and 46 with Pd 44, 48, and 52 it is to be noted that although titanium and aluminum singly or in certain combinations result in improved strength, Example Pd 51 results in unexpectedly high strength along with excellent 1000 hour–1700° F. oxidation resistance and no erosive effect on Raney 41. Pd 44 was the first precipitation strengthened alloy of the series with titanium and aluminum being added to obtain the precipitate needed in the alloy for such strengthening. A photomicrograph of the structure of Example Pd 44 in the as-brazed condition shows a precipitate of a needle-like phase in the matrix of the alloy. Similarly, aluminum and titanium were included in Examples Pd 48 and 52 for precipitation strengthening characteristics. It is apparent from the table that an unexpected strengthening mechanism existed with Example Pd 51.

Further evaluation and melts of alloys established a broad range for the alloy of this invention as, by weight, 30–35% Cr, 16–19% Pd, 4–6% Si, 1.1–3% Ti, 1–2.5% Al with the balance nickel and impurities. In its preferred form the alloy of the present invention, the tensile properties for which are shown in the drawing, consists essentially of, by weight, 30–33% Cr, 17–18% Pd, 4.5–5% Si, 2.7–2.9% Ti, 1.7–1.9% Al with the balance nickel.

Referring to the drawing, the tensile properties of Raney 41 alloy joints brazed with the alloy of the present invention within its preferred range is presented.

Although the drawing is a graphic representation of all the tensile properties of the alloy of the present invention in its preferred form, it is to be noted that the present alloy is considerably stronger than known high temperature brazing alloys as represented by average sheet butt-joint tensile strength of about 52,000 p.s.i. at room temperature, 39,000 p.s.i. at 1550° F. and 35,000 p.s.i. at 1700° F. It should be further noted that the shear tensile properties in the drawing represent stresses applied to the test joint. However, all failures occurred in the parent metal, and not in the joint, indicating the superior strength of the preferred form of the alloy of this invention.

The brazing alloys shown in the table were first prepared as 100 gram buttons by non-consumable tungsten electrode arc-melting in a copper mold furnace which was first evacuated and then back-filled with helium for melting. However with the recognition of the value of Example Pd 51, 1.5 pound heats were prepared for use in brazing the test specimens and simulated hardware by standard vacuum induction melting techniques. The brazing was conducted in a vacuum tube furnace at a vacuum pressure of 0.4 micron or less.

Although the present invention has been described in connection with specific examples, it will be understood by those skilled in the art, the modification and variations of which the present invention is capable.

What is claimed is:
1. An improved high temperature brazing alloy having precipitation strengthening characteristics and consisting essentially of, by weight, 30–35% Cr; 16–19% Pd; 4–6% Si; 1.1–3% Ti; 1–2.5% Al with the balance nickel and impurities.
2. An improved high temperature brazing alloy having precipitation strengthening characteristics and consisting essentially of, by weight, 30–33% Cr; 17–18% Pd; 4.5–5% Si; 2.7–2.9% Ti; 1.7–1.9% Al with the balance nickel and impurities.

References Cited in the file of this patent

FOREIGN PATENTS

| | | |
|---|---|---|
| 373,725 | Germany | Apr. 14, 1923 |
| 86,591 | Great Britain | Jan. 10, 1962 |